United States Patent Office 3,014,902
Patented Dec. 26, 1961

3,014,902
STABILIZED COMPOSITION CONTAINING ETHYLENE IMINE DERIVATIVES AND THE PREPARATION THEREOF
Kunikatsu Nakabayashi, Toyonaka-shi, Japan, assignor to Sumitomo Chemical Company, Ltd., Osaka, Japan, a corporation of Japan
No Drawing. Filed Sept. 15, 1958, Ser. No. 760,846
Claims priority, application Japan Sept. 19, 1957
1 Claim. (Cl. 260—239)

This invention relates to a stabilized composition containing ethylene imine derivatives and the preparation thereof. More particularly, the present invention is concerned with a stabilized, therapeutically active composition comprising ethylene imine derivatives such as N,N',N''-triethylene thiophosphoramide, N,N',N''-triethylene phosphoramide, N,N-diethyl-N',N''-diethylene phosphoramide, N,N'-diethylene-N''-morpholine thiophosphoramide, 1,3,5-triethyleneimino-2,4,6-triazine, O,O'-p-phenylene-N,N',N'',N'''-tetraethylene tetramide di(thio)-phosphate and the like and anhydrous polyethylene glycol, and the preparation thereof.

It has been found that ethylene imine derivatives such as those indicated above are very effective as chemotherapeutic agents with respect to cancer in human beings. Clinical studies of some of said derivatives have proved their effectiveness (cf. Cancer 8, 498–522 (1955), New England J. of Medicine 252, 879–887 (1955)).

However, all these compounds are generally unstable and tend to cause polymerization gradually to form insoluble polymers if the crystals are allowed to remain at room temperature. Further, the tendency to produce a polymer is even greater in the solution state than in the crystal state. Therefore, it has been assumed that it is impossible to preserve the injective solution which comprises water as a solvent.

Accordingly, for the purpose of clinical studies the above type of ethylene imine derivatives is usually preserved under refrigeration in the form of a dry sterile powder composition prepared by aseptic manipulation and when needed, said composition is dissolved in distilled water for injection and immediately used.

Even under such circumstances, however, the composition preserved over a long period is unsuitable for injection, as it results in turbidity or deposits of insoluble crystals due to the above-noted polymerization, when it is dissolved in water.

On the other hand, oil solutions, which have also been considered for injections, are stable compared with a powder composition, but an oil solution for injection induces severe pains, when used. Moreover, there is the secondary action of oil per se which prevents the same from being administered intravenously.

To improve the above-noted defects, additions of various polymerization inhibitors or antioxidants have been tried, but no suitable and stable composition has ever been obtained. That is why preparations including ethylene imine derivatives which have an excellent effect on malignant tumors, are not used commercially.

It has now been found, according to the invention, that ethylene imine derivatives can be preserved for a long period without decomposition in a form whereby said ethylene imine derivatives are dissolved in liquid anhydrous polyethylene glycol having a molecular weight of 200 to 600. That is to say, it has been found that an ethylene imine derivative which is dissolved in said anhydrous polyethylene glycol and sealed in a container can be preserved over a period of one year without showing any change. It has also been found that a solution prepared as above is stable not only at room temperature, but also during heat treatment.

Since heat treatment is allowed, the ethylene imine derivatives are capable of being dissolved with a considerably higher molecular weight polyethylene glycol anhydride with heating. In fact, when the above ethylene imine derivatives are dissolved in paste- or wax-like substances, such as the so called carbowaxes which previously were used only as ointment bases, which have a molecular weight of, for instance, 1500 to 6,000, it is seen that the ethylene imine derivatives can be preserved without showing any change, as is the case when a liquid anhydrous polyethylene glycol having a molecular weight of 200 to 600 is used.

Considering that crystals of the ethylene imine derivatives, even when preserved under cooling, are so unstable as to cause decomposition or polymerization, the above findings are very unexpected. Advantageously, as a result of the invention, a therapeutic composition containing an ethylene imine derivative can easily be prepared and be preserved over a long period of time. Thus, various ethylene imine derivative compositions which are useful as chemothrapeutic agents can now be developed to a stage of practical use.

Accordingly, one object of the present invention is to provide therapeutic compositions containing the ethylene imine derivatives and the effectiveness of which can be preserved at room temperature over a long period of time.

Another object of the present invention is to provide for purposes of injection, an improved composition containing an ethylene imine derivative and method for the preparation thereof.

Still another object of the present invention is to provide ointment and tablet composition containing ethylene imine derivatives and methods for the preparation thereof, said composition being subject neither to decomposition nor polymerization and showing no adverse changes as a result of the lapse of time and maintaining their biological activities.

Other objects and advantages comprehended by the present invention will be apparent from the description which follows.

According to the invention, a water-soluble ethylene imine derivative is selected from compounds represented by the general formula, $$\left(\begin{array}{c}CH_2\\ \phantom{X}\\ CH_2\end{array}\right\rangle N\right)_n\!\!-R$$

wherein R is

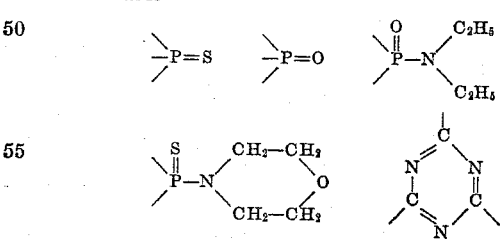

or

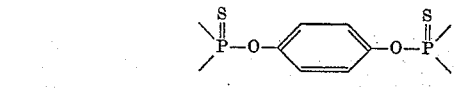

and n is an integer such as 2, 3 or 4. One of these derivatives or the like is dissolved with anhydrous polyethylene glycol with, or without heat. Desirable water-soluble ethylene imine derivatives used in the invention are N,N',N''-triethylene thiophosphoramide, N,N',N''-triethylene phosphoramide, N,N-diethyl-N',N''-diethylene phosphoramide, N,N' - diethylene - N''' - morpholinothiophosphoramide, 1,3,5 - triethyleneimino - 2,4,6 - triazine, O,O'-p-phenylene - N,N',N'',N''' - tetraethylene tetramide di(thio)phosphate. The resulting solution, in which the proportion of the ethylene imine derivative to the anhydrous polyethylene glycol is preferably 1–5 to 99–95 by weight, is preserved in a sealed container. For dissolving with heat, a mixture of the ethylene imine derivatives and polyethylene glycol may be heated on a water bath, or the polyethylene glycol, which is previously melted, may be added to the ethylene imine derivatives. The composition thus prepared can be preserved at room temperature for a long period of time without a change of content caused by polymerization or decomposition of the ethylene imine derivatives, nor change due to lapse of time nor a change of toxicity and effectiveness. Thus the quality of said composition can be guaranteed.

The following data, which are concerned with the stability of N,N',N''-triethylene thiophosphoramide injections together with a supplementary explanation, will serve to show the effect of the present invention more clearly.

tion degree and deposition of insoluble polymerization product were tested. The results thus obtained are set forth in Table 1.

For comparison, difference in lapse of time in the case when any additive other than polyethylene glycol was used is also shown in the following table.

TABLE 1

| Additive | Preservation temperature | Preservation period | Stability |
| --- | --- | --- | --- |
| Anhydrous polyethylene glycol. | Room temperature. | 12 months. | No change. |
| Do. | do. | do. | Do. |
| Carbowax. | do. | do. | Do. |
| Do. | do. | do. | Do. |
| Do. | do. | do. | Do. |
| Distilled water (no heating). | do. | 2 weeks. | White colored turbidity, deposition of polymer. |
| Anhydrous ethylene glycol (no heating). | do. | 2 months. | White colored turbidity. |
| Anhydrous propylene glycol (no heating). | do. | do. | Do. |
| None (no heating). | do. | do. | Deposition of polymer. |

(B) *Change of contents when the injection solution is preserved at room temperature.*—The samples prepared as above were preserved at room temperature over certain periods of time, and the contained amount of N,N',N''-triethylene thiophosphoramide was determined by the method which is as follows. A certain amount of sample was precisely weighed. Saturated saline solution and a certain amount of N/10-sulfuric acid were added thereto and then allowed to stand a short time to effect ring-opening of ethylene imine. The remaining sulfuric acid, which had not been consumed, was measured by means of back-titration by N/10-NaOH (one modification of C. R. Philips' method which is described in American Journal of Hygiene, 50, 276 (1949)). The results are shown in Table 2.

TABLE 2

| Solvent | N,N',N''-triethylene-thiophosphoramide contents (percent) | | | | | | | | |
| --- | --- | --- | --- | --- | --- | --- | --- | --- | --- |
| | Initial | 1 week | 2 weeks | 1 month | 2 months | 3 months | 4 months | 6 months | 12 months |
| Distilled water | 97.4 | 95.0 | 91.3 | 85 | | | | | |
| Do | 98.3 | 95.1 | 92.4 | 85.6 | | 56.0 | | | |
| Anhydrous propylene glycol | 94.6 | | | 77.0 | 63.8 | 60.6 | 59.5 | | |
| Anhydrous polyethylene glycol 200 | 94.5 | | | 94.4 | 94.35 | 94.21 | 94.11 | 93.3 | 92.3 |
| Anhydrous polyethylene glycol 400 | 94.6 | | | 94.22 | 94.36 | 94.02 | 94.01 | 93.4 | 92.6 |
| Anhydrous polyethylene glycol 4000 | 95.3 | | | 95.0 | 94.93 | 94.61 | 94.53 | 94.0 | 93.3 |

(A) *Change of the injection solution by the lapse of time.*—One gram of N,N',N''-triethylene thiophosphoramide powder was dissolved with 100 gr. of anhydrous polyethylene glycol or carbowax. When necessary, heating up to 50–60° C. was applied to provide a uniformly dissolved mixture. The resulting mixture was sealed into ampules and, thereafter, subjected to heat sterilization at 100° C. for 60 minutes, and preserved at room temperature. After a determined period of time, the preserved mixture was dissolved in distilled water, and the colorization As clearly shown in the above table, the injection solutions prepared by the method in accordance with the present invention scarcely show any change of contents.

(C) *Influence of heating on stability.*—1% N,N',N''-triethylene-thiophosphoramide solution in anhydrous polyethylene glycol or carbowax (when needed, the heating at 50–60° C. was used to prepare the above solution) was heated at 100° C. for a predetermined period of time. Thereafter, the contents were measured by the modified Philips' method. The results were as follows.

TABLE 3

| Solvent | After heating at 100° C. during 1 hour | After heating at 100° C. during 5 hours | After heating at 100° C. during 10 hours |
| --- | --- | --- | --- |
| Anhydrous polyethylene glycol 400 | 100 | 98.9 | 98.6 |
| Anhydrous polyethylene glycol 300 | 100 | 96.4 | 95.7 |
| Anhydrous polyethylene glycol 1500 | 100 | 98.1 | 96.0 |
| Anhydrous polyethylene glycol 4000 | 100 | 98.4 | 95.2 |
| Anhydrous polyethylene glycol 6000 | 100 | 98.6 | 95.4 |
| Polyethylene glycol 400 containing 10% water | 100 | 94.2 | 82.6 |
| Distilled water | 63.6 | 28.6 | |
| Anhydrous ethylene glycol | 90.9 | 71.2 | 51.0 |
| Anhydrous propylene glycol | 87.5 | 60.4 | |

(In the above table, figures are the ratio of remaining N,N',N''-triethylene thiophosphoramide.)

As shown in Table 3, the composition prepared by the method according to the present invention is very stable with respect to heating. When the N,N',N''-triethylene thiophosphoramide crystals were heated at 100° C., the remainder of said crystals was 91.6% at 20 minutes, 87.5% at 30 minutes, 68.0% at one hour, and 0% at three hours.

Then, the toxicity on mice and the effect on rats having Yoshida sarcoma were studied and the results which are given hereinunder showed that, according to the present invention, the ethylene imine derivatives can be preserved effectively for a long period of time.

(D) *Toxicity-test.*—1% N,N',N''-triethylene thiophosphoramide solution in anhydrous polyethylene glycol or carbowax (when needed, the heating was applied to prepare the above solution) was placed in ampules and subjected to heat sterilization in various conditions, and thereafter preserved at room temperature during determinable periods of time. Then, acute toxicities, or $LD_{50}$, of the above prepared sample and the sample which was not subjected to heat treatment and was not preserved and the crystal per se, when administered intraperitoneally, were measured. The comparative data is as follows.

TABLE 4

| Sample | Heat treatment | Time of preservation | $LD_{50}$ mg./kg. |
| --- | --- | --- | --- |
| No additive | | | 14.5 |
| Anhydrous polyethylene glycol 400 | | | 14.5 |
| Carbowax 1500 | 4 times fractional sterilization at 60° C. | 4 months at room temperature. | 16.0 |
| Anhydrous polyethylene glycol 600 | heating at 100° C. during 30 minutes. | 6 months at room temperature. | 16.3 |
| Carbowax 4000 | 4 times fractional sterilization at 70° C. | 7 months at room temperature. | 16.1 |

(E) *Effect of increase in the life span of rats bearing Yoshida sarcoma.*—Yoshida sarcoma cells were intraperitoneally injected to rats (2 million/rat) and, after three days, the inoculated animals became sick. Each sample was intraperitoneally administered during 8 days and the effects of increase in life span were compared to the case of the physiological saline administration. The average number of days of life span of the group to which physiological saline was administered was 100, the average number of days of life span of each group to which each sample was administered were determined as index number. The results are shown as follows.

TABLE 5

| Sample | Administered amount/day, mg./kg. | Effective increase of life span |
| --- | --- | --- |
| No additive | 0.5 | 333 |
| Anhydrous polyethylene glycol 400 | 0.5 | 293 |
| Carbowax 1500 (heating at 60° C., preserved during 4 months) | 0.5 | 325 |
| Anhydrous polyethylene glycol 600 (heating at 100° C. during 30 min., preserved during 6 months) | 0.5 | 317 |
| Carbowax 4000 (heating at 70° C., preserved during 7 months) | 0.5 | 320 |

As shown in the above table, there are few differences in the antitumor activity of each sample.

In accordance with the present invention, as explained hereinabove, only polyethylene glycol is useful for a stable preservation of the ethylene imine derivatives and the inventive idea of the present invention is very different from that according to which polyethylene glycol in an ordinary injection is used as a solubilizing agent. Accordingly, when a injection composition containing a water-insoluble principal ingredient, for instance diphenyl sulfone injection, is prepared, polyethylene glycol is used as a solubilizing agent since an injection in the form of a suspension in water or oil causes pain or body absorption of the principal ingredient is inconveniently slow. In this case, however, the object is to solubilize the ingredient and the principal ingredient is dissolved in a 45–70% aqua solution of polyethylene glycol to prepare a clear injection.

However, the ethylene imine derivatives which are used in the present invention are very soluble in water. Therefore, there is no need for solubilizing agents and water promotes a polymerization reaction, as shown above.

In another example, sodium pentobarbital which is hardly soluble in alcohol is dissolved in the polyethylene glycol-alcohol mixture and thus the injection is obtained. In this case too, it is obvious that solubilizing action of the polyethylene glycol to alcohol is employed.

As stated hereinabove, a number of examples in which polyethylene glycol is used as a solubilizing agent for injection purposes are previously known. In these cases, the polyethylene glycol is used in the form of a mixture with any suitable solvent.

In the present invention, as an existence of a solvent (such as water) promotes polymerization, anhydrous polyethylene glycol is used to dissolve the ethylene imine derivatives as a principal ingredient, and the resulting solution sealed in a container is preserved at room temperature. The stabilized composition thus preserved has water added thereto as the solvent, at first when it is used. Therefore, it should be clearly understood that polyethylene glycol is not used as a solubilizing agent.

Hereinabove, the preparations of the ethylene imine derivative compositions, particularly N,N',N''-triethylene thiophosphoramide injection, as well as the effects of the composition prepared by a method according to the present invention, have been mentioned. However, the inventive idea of the present invention is not limited thereto and can be applied in modified form by those skilled in the art. For example, 1–5 parts by weight of the ethylene imine derivatives may be dissolved in 99–95 parts by weight of carbowax and, after cooling, the resulting solid mixture can be powdered and then have added thereto a suitable excipient to form tablets. The tablets thus prepared are preserved in such a container as to remove as much water as possible. Alternatively, 1–5 parts by weight of the ethylene imine derivatives may be dissolved with 99–95 parts by weight carbowax to prepare an ointment. As stated above, various type of composition can be prepared. Also the ethylene imine derivatives may be dissolved with polyethylene glycol 200–400 and then carbowax or another suitable carrier can be added to prepare an ointment or tablet.

The following examples will serve to illustrate the present invention.

Example 1

1 g. of N,N',N''-triethylene thiophosphoramide powder was dissolved in anhydrous polyethylene glycol 400 to form 100 cc. of total volume. The resulting composition, after preservation in a sealed container at room temperature for 12 months, hardly showed any change in content and did not cause turbidity or deposition of floating particles when diluted with distilled water.

Example 2

1 g. of N,N',N''-triethylene thiophosphoramide powder was sterilized, and then 2 cc. of previously heat-sterilized anhydrous benzyl alcohol were added thereto, together with polyethylene glycol 400, to form 100 cc. of total volume. Thereafter, the resulting solution was subdivided by aseptic procedures.

These compositions thus prepared, after preservation in a sealed container at room temperature during 12 months, showed little change of contents, and did not show turbidity or deposition of floating particles when diluted with water for injection.

Example 3

1 g. of N,N',N''-triethylene thiophosphoramide powder was sterilized, and to this was added aseptically the previously heat-sterilized anhydrous polyethylene glycol 400, to form 100 cc. of total volume. Then, the resulting solution was subdivided by aseptic procedures. These compositions, after preservation in a sealed container at room temperature during 6 months, did not show any apparent change and also did not show turbidity or deposition of floating particles when diluted with water for injection. By chemical quantitative analysis, it was showed that a depression of contents, after preservation at room temperature during 6 months, was only about 1.5%.

Example 4

1 g. of 2,4,6-triethyleneimino-1,3,5-triazine powder was treated in the same manner as in Example 1.

The composition prepared, after preservation in a sealed container at room temperature during 12 months, did not show any apparent change and did not show turbidity or deposition of floating particles when diluted with distilled water.

Example 5

1 g. of N,N',N''-triethylene thiophosphoramide powder was dissolved in anhydrous polyethylene glycol 400, to form 100 cc. of total volume. After being sealed in a container, the resulting solution was subjected to heat sterilization at 100° C. for 60 minutes. This composition, after preservation at room temperature during 12 months, showed little change of contents and did not show turbidity or deposition of floating particles when diluted with distilled water. There was no significant difference of effect on life prolongation of rats bearing Yoshida sarcoma between said composition and N,N',N''-triethylene thiophosphoramide crystal per se.

Example 6

99 g. of previously heated carbowax 4000 being very fluid in a range of 40–60° C. had added thereto 1 g. of N,N',N''-triethylene thiophosphoramide to effect uniform dissolving and mixing. The resulting product was placed in ampules and subjected to heat sterilization at 100° C. for 60 minutes. After preservation at room temperature for 12 months, there was no change of contents and, when the product was diluted with distilled water, colorization, turbidity or deposition of floating particles did not occur. As regards effect of life prolongation of the Yoshida sarcoma inoculated rats, there was little change.

Example 7

5 g. of N,N',N''-triethylene thiophosphoramide powder was mixed with 95 g. of carbowax 1500 and the mixture was uniformly melted by heating at 30–50° C. for about 5 minutes. The ointment thus prepared was placed in tube and preserved at room temperature for 6 months. There was no change of contents and degeneration such as colorization did not occur.

Example 8

1 g. of 2,4,6-triethylene-1,3,5-triazine powder was dissolved in anhydrous polyethylene glycol 600, to form 100 cc. of total volume. After being placed in ampules, the resulting solution was subjected to fractional sterilization four times at 60° C. for 30 minutes. The composition thus prepared, after preservation at room temperature for 12 months, did not show change of contents, change due to lapse of time, nor change of antitumor activity, and also did not show deposition of insoluble materials.

What is claimed is:

A method of stabilizing the ethylene imine derivative N,N',N''-triethylene thiophosphoramide which comprises incorporating 1–5 parts by weight of said ethylene imine derivative in 99–95 parts by weight of anhydrous polyethylene glycol having an average molecular weight of 200–600.

References Cited in the file of this patent

UNITED STATES PATENTS 2,841,581     Marxer             July 1, 1958

OTHER REFERENCES

Manufacturing Chemist, October 1951, p. 401.
Carpenter: J.A.P.A. Sci. Ed., January 1952, pp. 27–29.
Meyers: J.A.P.A., Prac. Pharm. Ed., January 1950, pp. 32–35.
Lesser: Drug and Cosmetic Ind., September 1951, vol. 69, No. 3, pp. 316–317, 378–379, 396–399.